United States Patent Office 2,840,382
Patented June 24, 1958

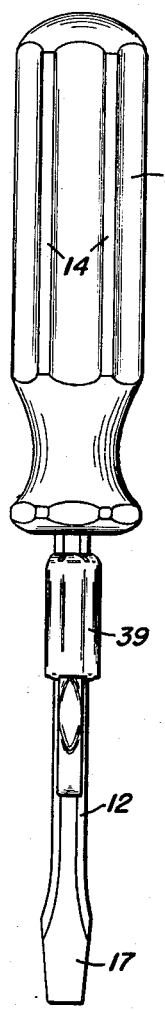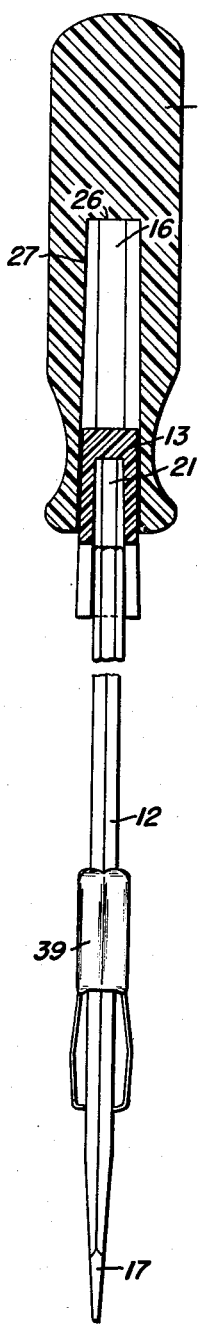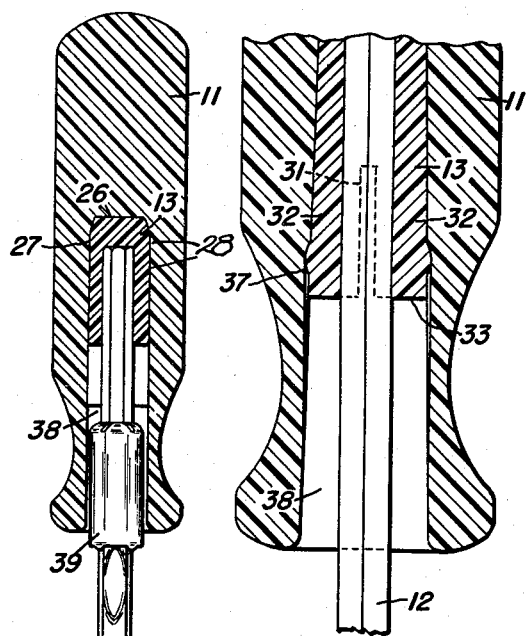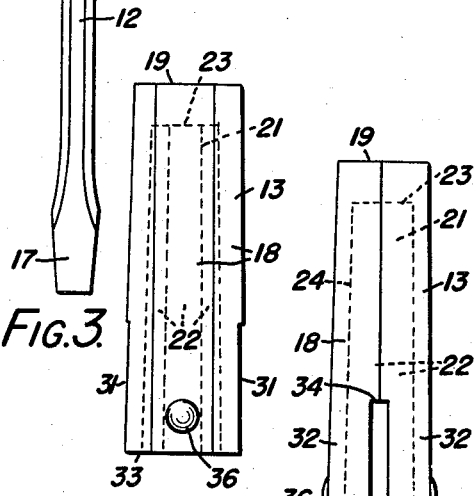

2,840,382
ANCHORING MEANS FOR THE SHANKS OF HAND TOOLS

Rudolph J. Velepec, Irondequoit, N. Y., assignor to Upson Brothers, Incorporated, Rochester, N. Y., a corporation of New York Application December 20, 1954, Serial No. 476,172

4 Claims. (Cl. 279—102)

My invention relates to anchoring means between the handle and the shank of hand tools such as screwdrivers, nutdrivers or runners, chisels, files and other hand tools such as are used by carpenters, masons, plumbers and mechanics of all kinds. Reference is made to my copending application Serial No. 317,900 filed October 31, 1952 and entitled "Anchoring Means for the Shanks of Hand Tools" of which this application is a continuation in part.

An object of my invention is to provide an anchoring means for the shanks of hand tools of the general character of the above-mentioned application wherein the anchoring insert is provided with means adapted to more firmly grip upon the shank of the tool especially for the purpose of taking care of minor variations in the dimensions of the insert and more particularly the dimensions of the bar stock of which the shank, for example, of a screwdriver is made.

My invention further contemplates an anchoring device for hand tools as described in the above-mentioned application in which the anchoring insert thereof is slotted from the margins of its cavity inward toward the other end thereof to provide tangs which are somewhat springlike in their action so as to more firmly grip upon the shank of the tool such as a screwdriver and allow for minor inaccuracies in the size of the cavity and the cross-sectional area of the bar stock of which the shank is made.

Other objects and advantages of my invention will be particularly set forth in the claims and will be apparent from the following description, when taken in connection with the accompanying drawings, in which:

Fig. 1 is a view of a screwdriver to which my novel shank anchoring means has been applied, the particular screwdriver shown being provided with screw-holding means;

Fig. 2 is a view showing the handle and insert in section, the parts being in partly assembled relation;

Fig. 3 is a view similar to Fig. 2 but with the parts in fully assembled relation;

Fig. 4 is an enlarged view of a portion of Fig. 3 but with the parts turned through 90 degrees;

Fig. 5 is an elevational view of the insert; and

Fig. 6 is a side view of Fig. 5.

The hand tool of the above-mentioned application and the anchoring means thereof particularly when used in connection with screwdrivers has met with considerable commercial success. However, it has been found in commercial practice that while the handle and its opening for the reception of the insert and the insert including its cavity for the reception of the shank of, for example, a screwdriver, may be made to relatively close tolerances, this is not always true of the bar stock of which the shank is made. While it would be possible to purchase on the open markets steel made to accurate dimensions, in an effort to maintain minimum costs in the manufacture of screwdrivers and hence minimum selling prices it is necessary to purchase standard bar stock. Such commercial bar stock may vary several thousandths in cross-sectional dimensions as between two bars and particularly between bars in different shipments or lots. Because best results are secured with the screwdriver of the above-mentioned application, when reasonably accurate tolerances are maintained, it has not always been possible to obtain a secure anchor of the shank in the insert when commercial bar stock is used.

The screwdriver comprises a handle, a shank and an insert generally indicated respectively by the numerals 11, 12 and 13. The handle 11 may be of any suitable material such as wood but the invention is particularly adapted for use in connection with handles of plastic material such as cellulose acetate butyrate. The exterior of the handle may be of any suitable construction, screwdriver handles being usually provided with means such as ribs 14 for the user to obtain a firm, non-rotational grip thereon. The handle is further provided with a bore 16 or opening which in the case of a plastic handle would be formed during molding.

The shank 12 may be made of any suitable metal stock, the end 17 of which is upset to provide a screwdriver bit of conventional construction. The shank may be circular in cross section, square, octagonal or any other polygonal shape. However, I have shown a hexagonal shank as I prefer the use of this type of material because it is more suited for the purposes of my invention and is readily available in bar stocks on a relatively inexpensive commercial basis. However, I have found that commercial bar stocks vary in cross-sectional area and it is primarily the means by which this difficulty is overcome which distinguishes this application from the above mentioned co-pending application.

Since the screwdriver is made perferably of hexagonal stock, the insert 13 is also hexagonal in cross-section and includes exterior side walls 18 and an exterior bottom wall 19. The insert 13 is provided with an opening or cavity 21 which has side walls 22 and a bottom wall 23. This cavity is relatively long and is preferably hexagonal in cross-section for the reception of the end of the hexagonal shank.

The side walls of the cavity 21 are tapered. The taper within reasonable limits may be any desired amount but preferably is of the order of 1°. The provide a firm grip between the side walls of the shank and side walls of the cavity, the minimum cross-sectional area of the cavity 21 must be less than the cross-sectional area of the shank 12. That is, at a point removed from the bottom wall 23, let us say adjacent the numeral 24, the cross-sectional area of the cavity 21 is less than the cross-sectional area of the shank.

While it would be possible to employ a cavity 21 tapered, as above described, and circular in cross-section, a hexagonal cavity to correspond to the hexagonal section of the shank is very greatly preferred. With this structure the side walls of the shank extend angularly with respect to each other and engage and interfit with the hexagonal side walls 22 of the cavity 21 substantially eliminating any tendency of the shank to rotate in the insert when normal torque forces are applied between the parts.

In the practice of my invention it would be possible to employ a tapered circular bore in the handle 11. However, I prefer to employ an opening or cavity 16 which is polygonal in shape. In the particular form of the invention shown the opening 16 is hexagonal and tapered at an angle which is variable within reasonable limits but which is preferably approximately 1°.

The exterior of the insert 13 is also preferably hexagonal in shape and tapered, this taper also being approximately 1°. While I prefer to taper the interior and exterior walls of the insert and the walls of opening 16 by approximately the same amount, this is not essential. The tapered interior and exterior side walls of the insert and the taper of the opening 16 in the handle may have tapers which vary somewhat from each other as will be obvious.

The cross-sectional area of the base 19 is greater than the cross-sectional area of the bottom 26 of the opening 16. That is, the cross-sectional area of the base 19 may be approximately the same as the cross-sectional area of the opening 16 at a point removed from the bottom 26, let us say, adjacent the point 27. While it would be possible to employ an insert 13 the exterior of which is circular and employ an opening 16 in the handle which is circular, provided that the cross-sectional area of the base 19 of the insert 13 is less than the minimum cross-sectional area of the opening 16, such a construction might be incapable of withstanding the torque forces encountered in the use of the tool without rotation of the insert in the opening 16. The hexagonal external side walls of the insert and the hexagonal side walls of the opening mate with each other so as to provide interengaging surfaces or walls extending angularly with respect to each other. Rotation of the insert 13 in the opening 16 under all normal torque forces encountered in the use of the tool is thus prevented.

It will now be understood that in the preferred form of the invention the shank, the cavity 21, and the exterior walls 18 of the insert and the walls of the opening 16 are each polygonal in shape. Possibly if each of these polygons was a triangle, the resistance to rotation of the shank in the insert and of the insert in the handle would be increased because of the greater angle between adjacent interengaging surfaces. However, I prefer hexagonal polygons because hexagonal bar stock is commercially available at reasonable prices.

It will now be understood that when the screwdriver is subjected to impact as when a hammer is applied to the head of the handle, with the bottom walls 19 and 26 in butting relation the resistance to penetration of the insert into the handle beyond the bottom wall 26 of the opening 16 is determined, at least in part, by the cross-sectional area of the bottom wall 19 of the insert. That is, instead of the impact being applied to the relatively small cross-sectional area of the end of the shank, the effective cross-sectional area to resist penetration, the area 19, is increased to an extent such that in meeting tests required by the Armed Forces substantially no penetration of the insert into the handle occurs.

One of the important aspects of the invention of the above-mentioned application is to provide an insert which is softer than the shank but harder than the material of the handle. The importance of this fact has been fully set forth in the above-mentioned application and need not be repeated herein. It is sufficient to state that when a force is applied as by a hammer on the end of the handle, the relative hardness of the parts causes a slight bulging adjacent the numeral 28 thereby tending to cause a yielding of the walls of the opening 16 in the handle tending to lock the parts more securely together.

As previously mentioned, I have found that the cross-sectional area of commercial hexagonal bar stock varies. The cavity in the insert might be suitable for accommodation of bar stock of relatively large cross-sectional area and hold the shank securely. However, when bar stock of relatively small cross-sectional area is encountered, then the insert will not hold the shank as securely as is desired.

The above difficulties I have overcome by making the cavity in the insert of a size in cross-sectional area small enough to accommodate and firmly grip upon bar stock of the smallest cross-sectional area encountered. In addition to decreasing the cross-sectional area of the cavity of the insert 13, I have provided the insert with slots 31 to divide the end of the insert into tangs 32. Any desired number of slots may be employed extending inwardly from the margin 33 of the insert part way down towards the bottom of the insert as illustrated at 34 (Fig. 5). I have, however, found that two slots 31 are sufficient for my purposes.

I have further thought it desirable to make the opening 16 in the handle slightly smaller by a few thousandths than would otherwise be the case if it were not necessary to allow for bar stock of varying cross-sectional area. Now it will be observed by a comparison of Figs. 2 and 3 that when bar stock of smaller than normal cross-sectional area is encountered and the shank is placed in the insert and the insert in the opening in the handle, the tangs 32 will yield outward due to the pressure between the shank and the walls of the insert. However, when the insert is pushed to the bottom of the opening in the handle as result of impact by a hammer, the walls of the opening in the handle will exert pressure on the tangs 32, pushing them toward each other and firmly locking the tangs on the tool shank. Where the bar stock is slightly over size, it is of course immaterial as the parts may be bottomed and locked without any difficulty.

Moreover, the slight dimensional changes in the opening in the handle and in the cavity in the insert and the use of slots to provide tangs provides a firm lock between the parts and prevents rotation of the shank in the insert even when the bar stock is slightly under size.

I have further found that by molding slightly raised buttons or protuberances 36 on the tangs, the pressure exerted by the walls of the opening in the handle on the tangs is increased to thereby still more firmly grip upon the tool shank. If the bar stock is slightly greater in cross-sectional area than normal, the buttons 36 cause no difficulty for the reason, as shown at 37 in Fig. 4, the buttons will recess themselves slightly in the walls of the handle opening due to the fact that the insert is of harder material than the material of the handle.

As mentioned in the above-mentioned co-pending application, the arrangement of parts provides a recess 38 in the handle for the frictional reception of the screw-holding device 39.

While I have shown my invention for use in connection with a screwdriver, as mentioned above the invention has general application to hand tools. Moreover, it will be apparent that various modifications and changes may be made in the structure shown, particularly in the form and relation of parts without departing from the spirit of my invention.

I claim:

1. A hand tool comprising, in combination, a tool shank, a handle having an opening defining the side walls and means for anchoring the end of said shank in said side walls, said anchoring means comprising an insert for reception in said opening, said insert having a cavity for reception of said shank, said cavity being defined by an open end having a margin and side walls, said insert having at least one slot extending inward from said margin toward the opposite end of said insert to form resilient tanks adapted to grip said shank, the exterior of said tangs having projections for engaging said side walls, said projections being positioned so that they will imbed themselves in said side walls when an oversize shank is inserted in said cavity.

2. A hand tool comprising, in combination, a tool shank, a handle having an opening defining side walls and means for anchoring the end of said shank in said side walls, said anchoring means comprising an insert for reception in said opening, said insert having a cavity for reception of said shank, said cavity being defined by an open end having margin and side walls, said insert having at least one slot extending inward from said margin toward the opposite end of said insert to form resilient tangs adapted to grip said shank, the exterior of said tangs having projections for engaging said side walls, said projections being positioned to abut said side walls to force said tangs inwardly to grip said shank when said insert is inserted in said opening.

3. A hand tool as claimed in claim 2 wherein said insert is of harder material than said handle.

4. A hand tool as claimed in claim 2 wherein said shank is harder than said insert and said insert is harder than said handle whereby said projections on said insert will imbed themselves in said side walls to accommodate an oversize shank.

References Cited in the file of this patent

UNITED STATES PATENTS

| | | |
|---|---|---|
| 628,927 | Ducharme | July 18, 1899 |
| 799,810 | Tredwell | Sept. 19, 1905 |
| 2,644,475 | Morton | July 7, 1953 |
| 2,759,734 | Velepec | Aug. 21, 1956 |